US011479343B2

(12) United States Patent
Tsai et al.

(10) Patent No.: US 11,479,343 B2
(45) Date of Patent: Oct. 25, 2022

(54) SPLIT GIMBAL

(71) Applicant: The Boeing Company, Chicago, IL (US)

(72) Inventors: Kevin Tsai, Seattle, WA (US); Bret Alan Bowers, Langley, WA (US)

(73) Assignee: THE BOEING COMPANY, Chicago, IL (US)

(*) Notice: Subject to any disclaimer, the term of this patent is extended or adjusted under 35 U.S.C. 154(b) by 308 days.

(21) Appl. No.: 16/826,544

(22) Filed: Mar. 23, 2020

(65) Prior Publication Data
US 2020/0216168 A1 Jul. 9, 2020

Related U.S. Application Data

(62) Division of application No. 15/895,742, filed on Feb. 13, 2018, now Pat. No. 10,669,013.

(51) Int. Cl.
B64C 13/30 (2006.01)
F16M 11/12 (2006.01)
F16C 11/06 (2006.01)
F16H 25/24 (2006.01)

(52) U.S. Cl.
CPC .............. B64C 13/30 (2013.01); F16C 11/06 (2013.01); F16H 25/24 (2013.01); F16M 11/123 (2013.01); F16H 2025/2445 (2013.01)

(58) Field of Classification Search
CPC ....... B64C 13/30; F16C 11/06; F16M 11/123; F16H 25/24; F16H 2025/2445
USPC ........................................................ 244/99.2
See application file for complete search history.

(56) References Cited

U.S. PATENT DOCUMENTS

| 2,951,373 A | * | 9/1960 | Summers, Jr. | ......... G01C 19/42 318/648 |
| 5,440,878 A | * | 8/1995 | Gleasman | ................. F01B 3/02 91/506 |
| 7,690,597 B2 | * | 4/2010 | Cavalier | ............. F16H 25/2454 244/99.2 |
| 8,033,500 B1 | * | 10/2011 | Charafeddine | ........... B64C 9/02 244/99.2 |
| 8,191,824 B2 | * | 6/2012 | Shaheen | ............... G01L 1/2225 244/99.2 |
| 8,291,782 B1 | * | 10/2012 | Shaheen | ................... B64C 9/02 74/89.34 |
| 8,496,204 B1 | * | 7/2013 | Charafeddine | ....... B64C 13/505 244/99.4 |

(Continued)

FOREIGN PATENT DOCUMENTS

EP 3127805 A1 * 2/2017 ............. B64C 13/28
GB 826964 A * 1/1960

Primary Examiner — Christopher P Ellis
(74) Attorney, Agent, or Firm — Kwan & Olynick LLP

(57) ABSTRACT

A gimbal having a split design, which can be used in an assembly for actuating an aerodynamic high lift device, is described. The gimbal enables a rotating load path when a force is transferred from the actuator to the high lift device via the gimbal. In particular, the split design can include two receivers which can be coupled to posts extending from a nut. The nut can be secured to a shaft which receives a force generated by the actuator. In one embodiment, the actuator can rotate the shaft to cause the gimbal to translate along the shaft. The split design provides a more compact form factor and is lighter in weight than traditional gimbal designs.

20 Claims, 8 Drawing Sheets

(56) References Cited

U.S. PATENT DOCUMENTS

| | | | |
|---|---|---|---|
| 2010/0001125 A1* | 1/2010 | Cavalier | F16H 25/2454 244/99.3 |
| 2011/0006154 A1* | 1/2011 | Maresko | B64C 9/02 244/99.2 |
| 2013/0313358 A1* | 11/2013 | Hale | F16H 25/2204 244/99.3 |
| 2014/0175217 A1* | 6/2014 | Ishihara | B64C 9/22 244/99.2 |
| 2016/0280356 A1* | 9/2016 | Medina | B64C 5/10 |
| 2018/0038314 A1* | 2/2018 | Hawksworth | F15B 15/1409 |
| 2019/0055005 A1* | 2/2019 | Young | F16H 25/22 |
| 2019/0127048 A1* | 5/2019 | Gartelmann | B64C 9/02 |
| 2019/0271282 A1* | 9/2019 | Hawksworth | F16H 25/2056 |
| 2019/0291851 A1* | 9/2019 | Wagner | B64C 9/20 |
| 2019/0359322 A1* | 11/2019 | Tsai | F16C 11/06 |
| 2020/0039637 A1* | 2/2020 | Polcuch | F16H 61/12 |
| 2021/0162294 A1* | 6/2021 | Li | H04B 10/50 |
| 2021/0245879 A1* | 8/2021 | Chen | G05D 1/0808 |

\* cited by examiner

SPLIT GIMBAL

CROSS-REFERENCE TO RELATED APPLICATIONS

This application is a divisional of U.S. patent application Ser. No. 15/895,742, entitled: "Split Gimbal", filed on 2018 Feb. 13, which is incorporated herein by reference in its entirety for all purposes.

TECHNICAL FIELD

This disclosure generally relates to actuating high lift devices on airplanes. More specifically, this disclosure relates to a gimbal which provides extra degrees of freedom of motion when an actuator is used to actuate a high lift device.

BACKGROUND

Modern aircraft, such as large passenger jets, need to operate at various speeds, including a lower speed during take-off and landing and higher speed during cruise. To accommodate operations at the various speeds, the aircraft wings include high lift devices. Typically, the high lift devices are actuatable relative to a fixed portion of the wing. By changing positions of the high lift devices relative to the fixed portion of the wing, various aerodynamic effects are achieved. The aerodynamics effects are used to control the aircraft. For example, the aerodynamic effects are used to generate lift during low speed operations, such as take-off and landing.

Actuators are used to change the position of the high lift device. For example, an actuator installed in a wing can be used to change a position of a flap on the wing. The actuators generate a motion, which is transferred, via an assembly, from the actuator to the high lift device. For aerodynamic, weight, cost and integration reasons, it is desirable for the assembly, which transfers the motion from the actuator to the high-lift device, to be as light-weight and compact as possible.

SUMMARY

Assemblies for actuating an aerodynamic high lift device on an aircraft are described. In one embodiment, a force generated by an actuator can be transferred to the aerodynamic high lift device via a gimbal. The gimbal can utilize a split design, which provides a compact form factor.

The gimbal can be generally characterized as including 1) a nut having a first post, a second post and a first aperture where the aperture is configured to receive a shaft; 2) a first receiver, 3) a second receiver and 4) one or more fasteners for securing the first receiver to the second receiver. The first receiver, the second receiver and the nut can be assembled such that the nut is secured in place relative to the first receiver and the second receiver via the first post and the second post. Further, the nut can be disposed within a second aperture formed by the first receiver and the second receiver.

The first receiver can include a first top portion, which partially surrounds the first post, ii) a first bottom portion, which partially surrounds the second post and iii) a first rotational attachment point. The second receiver can include i) a second top portion, which partially surround the first post, ii) a second bottom portion, which partially surround the second post and iii) a second rotational attachment point. The gimbal can be configured to receive a force via the shaft which causes the gimbal to translate wherein a translational movement of the gimbal causes a driver arm coupled to the first rotational attachment point and the second rotational attachment point to rotate about a rotational axis.

In particular embodiments, the nut can be threaded and can be configured to receive a threaded shaft. The threaded shaft can be configured to rotate which causes the gimbal to translate along the threaded shaft. In another embodiment, the nut can be secured at a fixed location to the shaft. A translational motion of the shaft can cause the gimbal to translate.

In other embodiments, the first receiver and the second receiver can have a common shape. Yet further, the second aperture can be circular. The diameter of the second aperture can smaller than a height of the nut between the first post and the second post.

In yet other embodiments, a first bushing can cover the first post and a second bushing can cover the second post. The first top portion and the second top portion of the first receiver and the second receiver can surround the first bushing and the first post. The first bottom portion and the second bottom portion can surround the second bushing and the second post. A first fastener coupled to the first receiver and the second receiver can be configured to secure the first bushing in place and a second fastener coupled to the first receiver and the second receiver can be configured to secure the second bushing in place.

In other embodiments, the driver arm can be coupled to an aerodynamic high lift device. The driver arm can be coupled to the gimbal via the first rotational attachment point and the second attachment point to prevent the shaft from being bent when the gimbal translates. The aerodynamic control surface can be located on a wing, a horizontal stabilizer or a vertical stabilizer.

Another aspect of the disclosure can be related to an assembly for actuating an aerodynamic high lift device on an aircraft. The assembly can comprise 1) an actuator coupled to a shaft where the shaft is configured to receive a force from the actuator; 2) a gimbal coupled to the shaft, 3) a driver arm coupled to the gimbal and 4) an aerodynamic high lift device coupled to the driver arm. A force from the actuator can cause the gimbal to translate, which can cause the first end of the driver arm to translate and rotate about a rotational axis. The rotation and translation of the first end can transfer a second force to the second end of the driver arm where the second force can cause the aerodynamic high lift device to actuate.

The gimbal can include 1) a nut having a first post, a second post and a first aperture wherein the aperture is configured to receive the shaft; 2) a first receiver including i) a first top portion, which can partially surround the first post, ii) a first bottom portion, which an partially surround the second post and iii) a first rotational attachment point; 3) a second receiver including i) a second top portion, which can partially surround the first post, ii) a second bottom portion, which can partially surround the second post and iii) a second rotational attachment point; 4) at least one fastener which can secure the first receiver to the second receiver to form a second aperture where the nut is disposed within the second aperture. The driver arm can be rotationally coupled to the first rotational attachment point and the second rotational point on a first end and the aerodynamic high lift device on a second end.

In particular embodiments, the assembly can be located in one of a wing of an aircraft, a horizontal stabilizer of the aircraft or a vertical stabilizer of the aircraft. In addition, the driver arm can be coupled to the gimbal via the first rotational attachment point and the second attachment point to prevent the shaft from being bent when the gimbal translates. In addition, the nut can be threaded and can be configured to receive a threaded shaft. The shaft can be configured to rotate which causes the gimbal to translate along the shaft. Yet further, an end cap can be attached at the end of the shaft which is configured to keep the nut from rotating off of the shaft. In yet other embodiments, the nut can be secured at a fixed location to the shaft where a translational motion of the shaft causes the gimbal to translate.

In further embodiments, the first receiver and the second receiver can have a common shape. In addition, the second aperture can be circular where a diameter of the second aperture can smaller than a height of the nut between the first post and the second post. In a particular embodiment, a first bushing can cover the first post and a second bushing can covers the second post were the first top portion and the second top portion surround the first bushing and the first post and where the first bottom portion and the second bottom portion surround the second bushing and the second post.

Another aspect of the disclosure can be related to a method of assembly. The method can be generally characterized as including 1) attaching a shaft to an actuator; 2) attaching a nut including a first post and a second post to the shaft; 3) attaching a first receiver and a second receiver to the first post and the second post of the nut where the first receiver and the second receiver can surround the nut and can fix an orientation of the nut relative to the first receiver and the second receiver and where the first receiver can includes a first rotational attachment point and where the second receiver can include a second rotational attachment point; 4) fastening the first receiver to the second receiver; 5) attaching a driver arm on a first end to the first rotational attachment point and the second rotational attachment point where the driver arm is rotationally coupled to the first rotational attachment point and the second rotational attachment point; and 6) attaching an aerodynamic high lift device to a second end of the driver arm.

In particular embodiments, the actuator can be configured to apply a force to the shaft which can causes the nut, the first receiver and the second receiver to translate. The translational motion of the nut can cause the first end of the driver arm to translate and to rotate about a rotational axis through the first rotational attachment point and the second rotational attachment point. This motion can transfer a second force to the second end of the driver arm, which can cause the aerodynamic high lift device to actuate.

In addition, the force can be rotational force which causes the shaft to rotate. The rotation of the shaft can cause the nut, the first receiver and the second receiver to translate along the shaft. The nut and the shaft can be threaded.

BRIEF DESCRIPTION OF THE DRAWINGS

Figure 1:
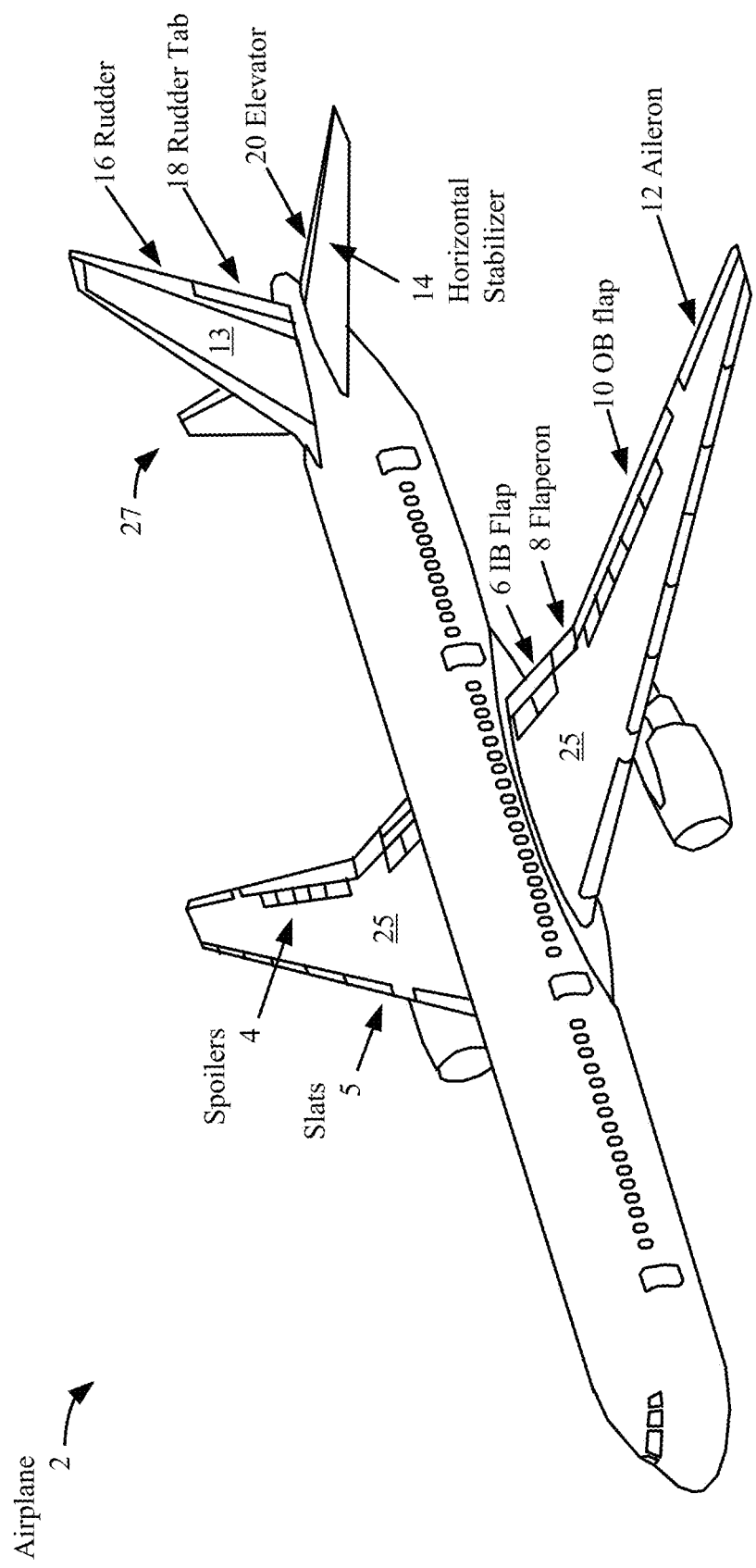

Having thus described examples of the disclosure in general terms, reference will now be made to the accompanying drawings, which are not necessarily drawn to scale, and wherein like reference characters designate the same or similar parts throughout the several views, and wherein:

FIG. 1 is a perspective view illustrating an airplane and aerodynamic high lift devices, according to one aspect of the present disclosure.

Figure 2:
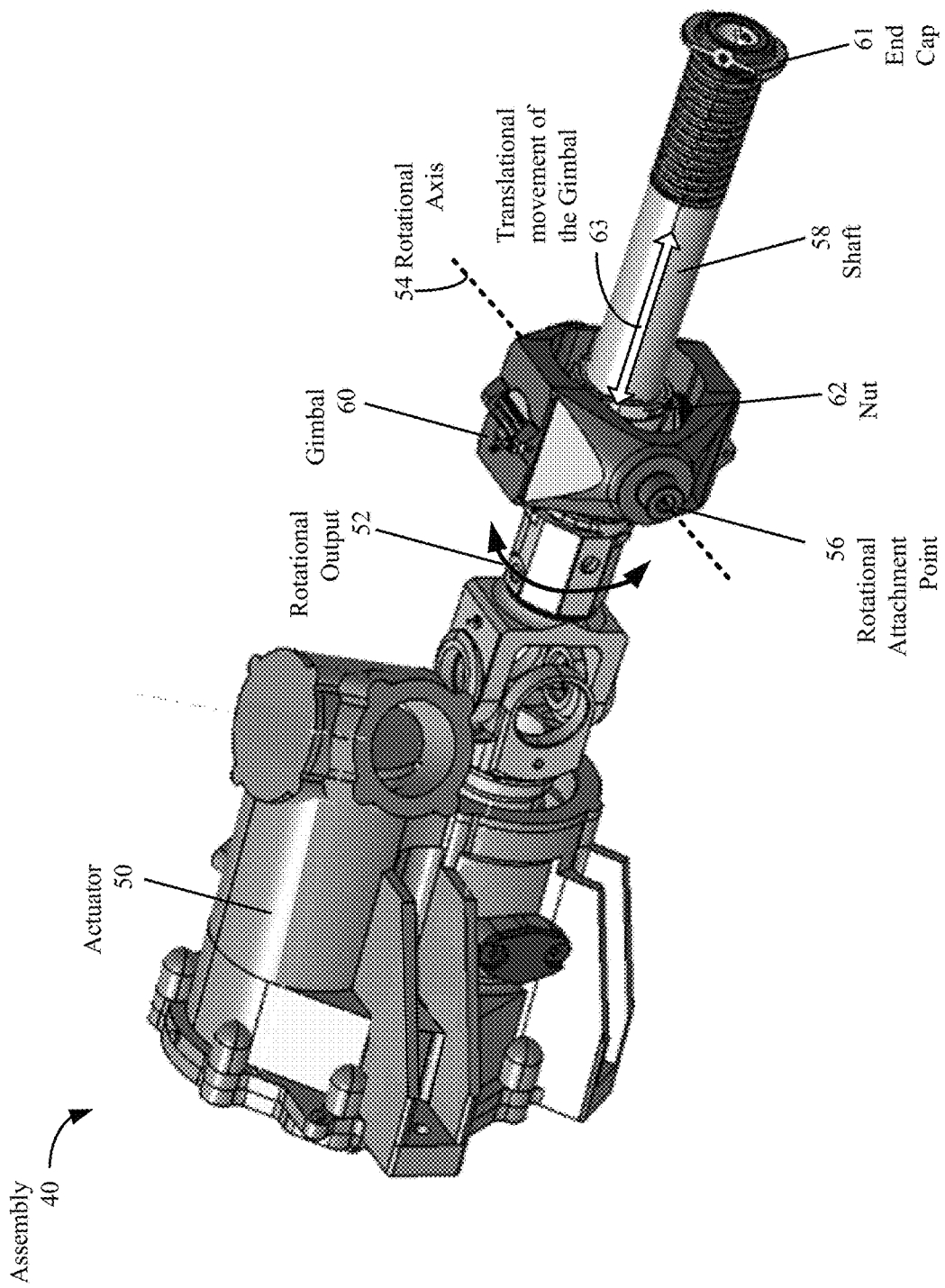
Figure 3:
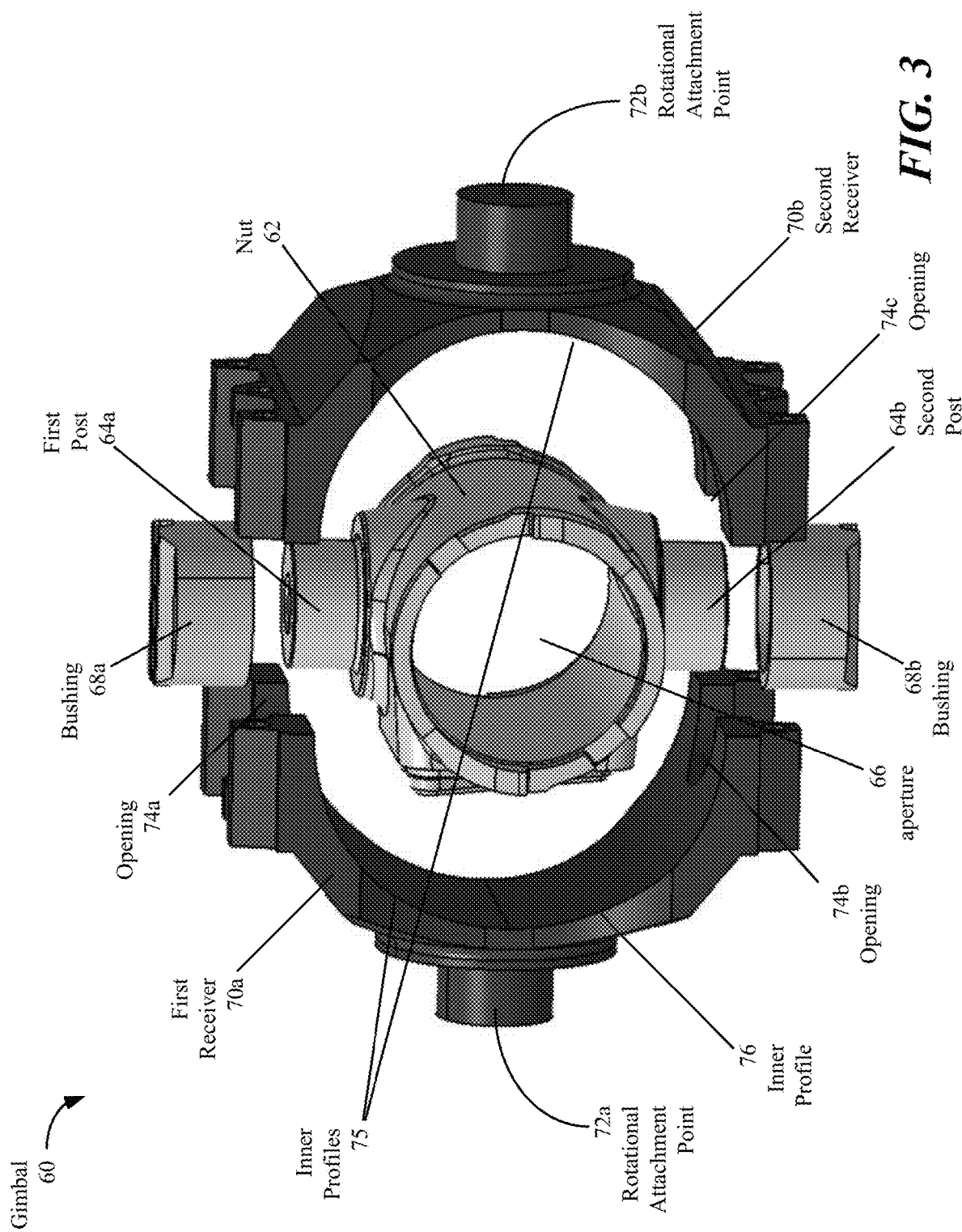

FIG. 2 is a perspective view of an assembly including an actuator and a gimbal used to provide a load path from the actuator to a high lift device according to one aspect of the present disclosure FIG. 3 is an expanded perspective view of the gimbal shown in FIG, 2, according to one aspect of the present disclosure.

Figure 4:
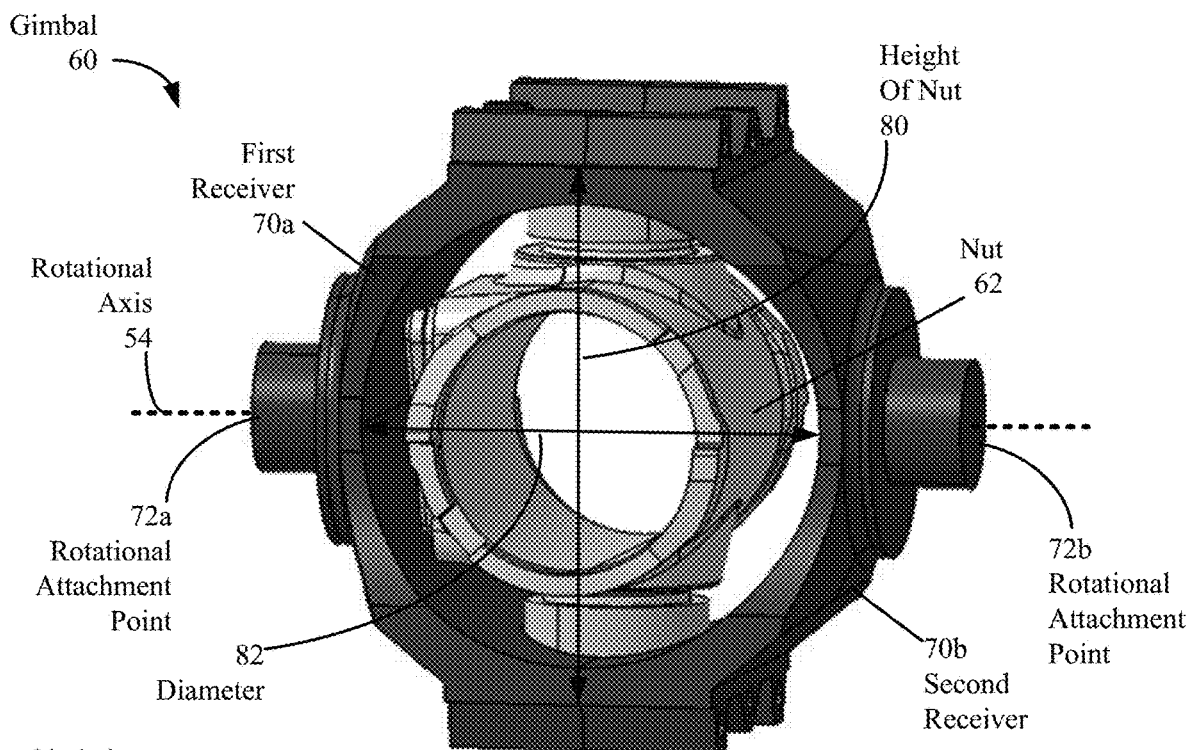
Figure 5:
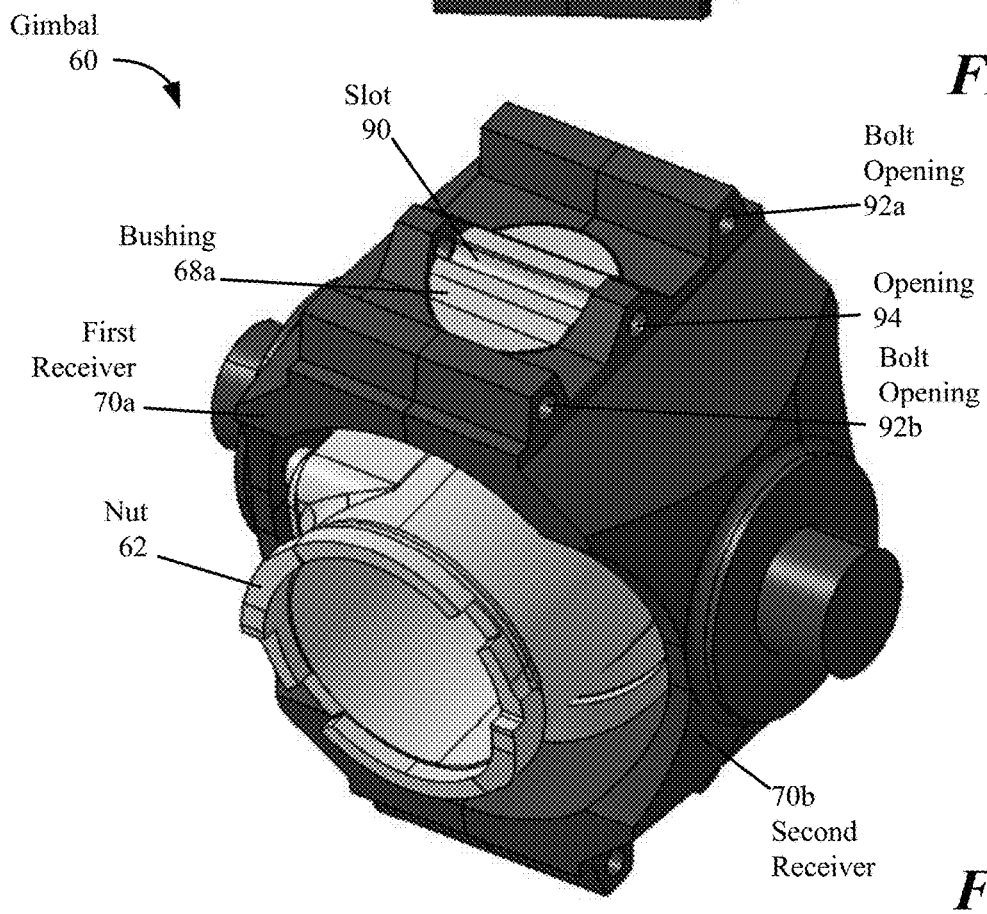

FIGS. 4 and 5 are perspective views of the gimbal shown in FIG. 2, according to aspects of the present disclosure.

Figures 6A, 6B:
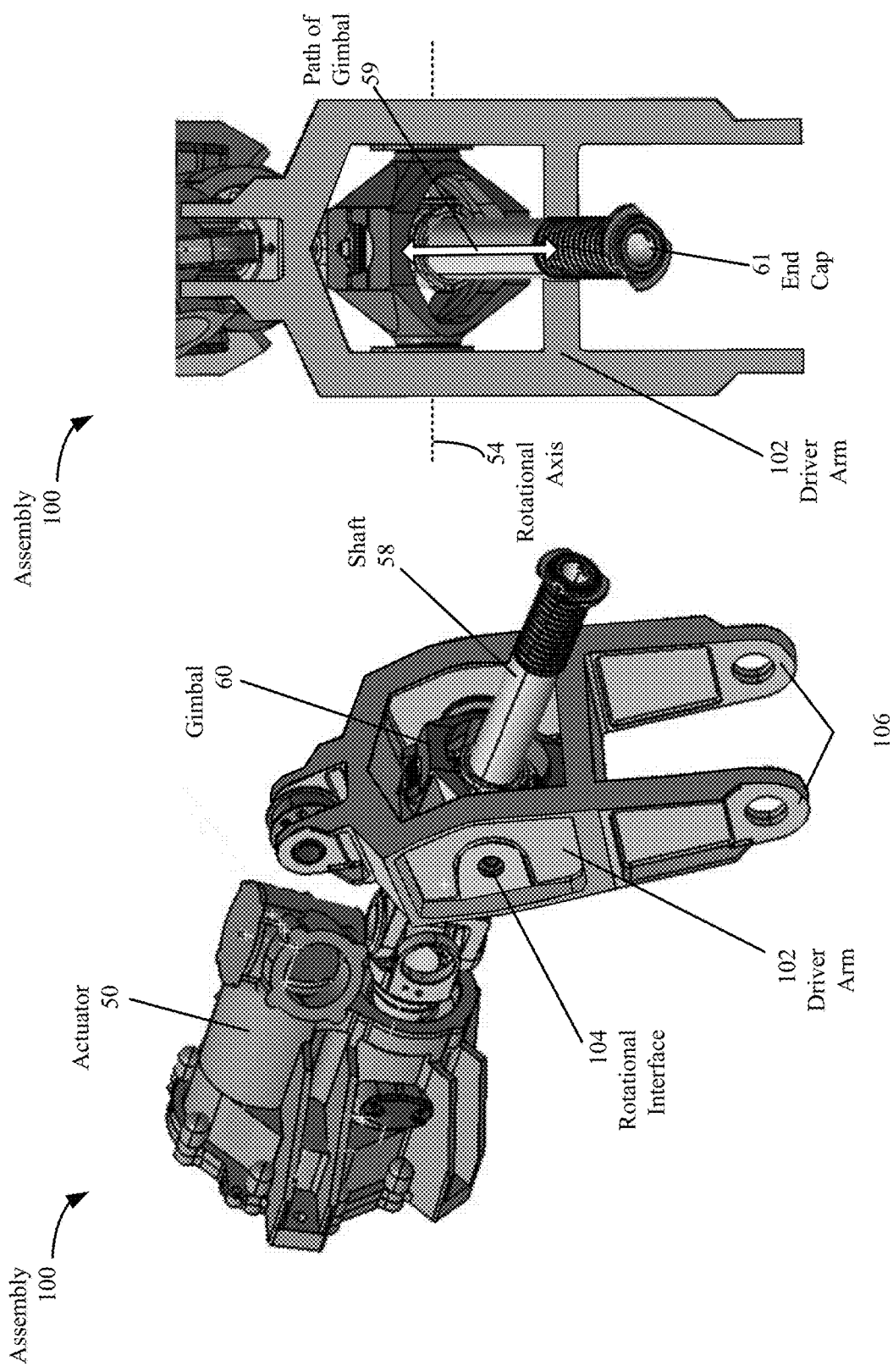

FIGS. 6A and 6B are block diagrams of an assembly including an actuator, a gimbal and a driver arm coupled to the gimbal, according to one aspect of the present disclosure.

Figure 7:
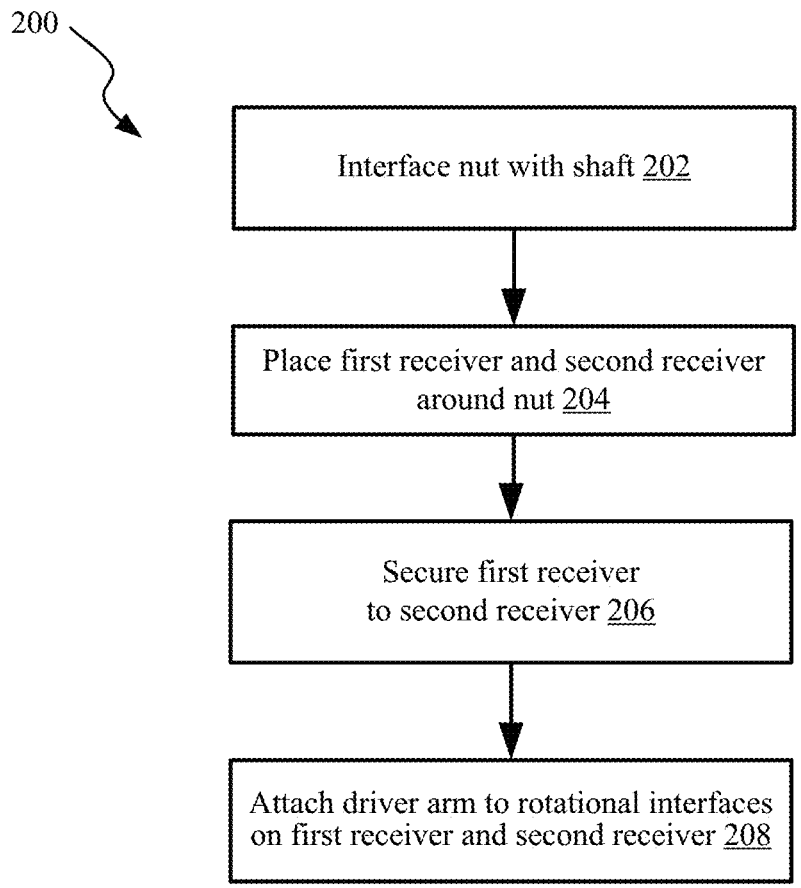

FIG. 7 is block diagram of a method of assembling a gimbal, according to one aspect of the present disclosure.

Figure 8:
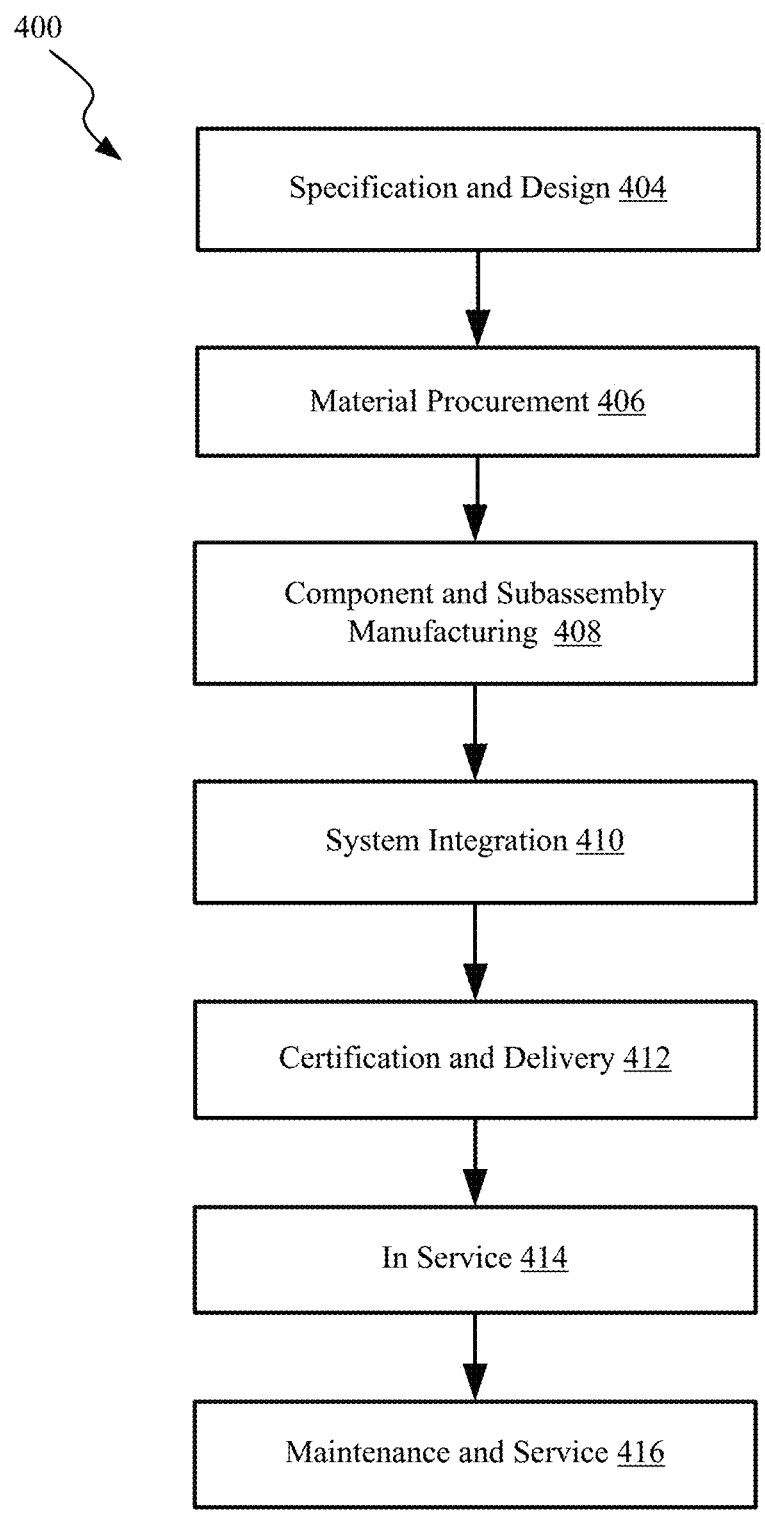
Figure 9:
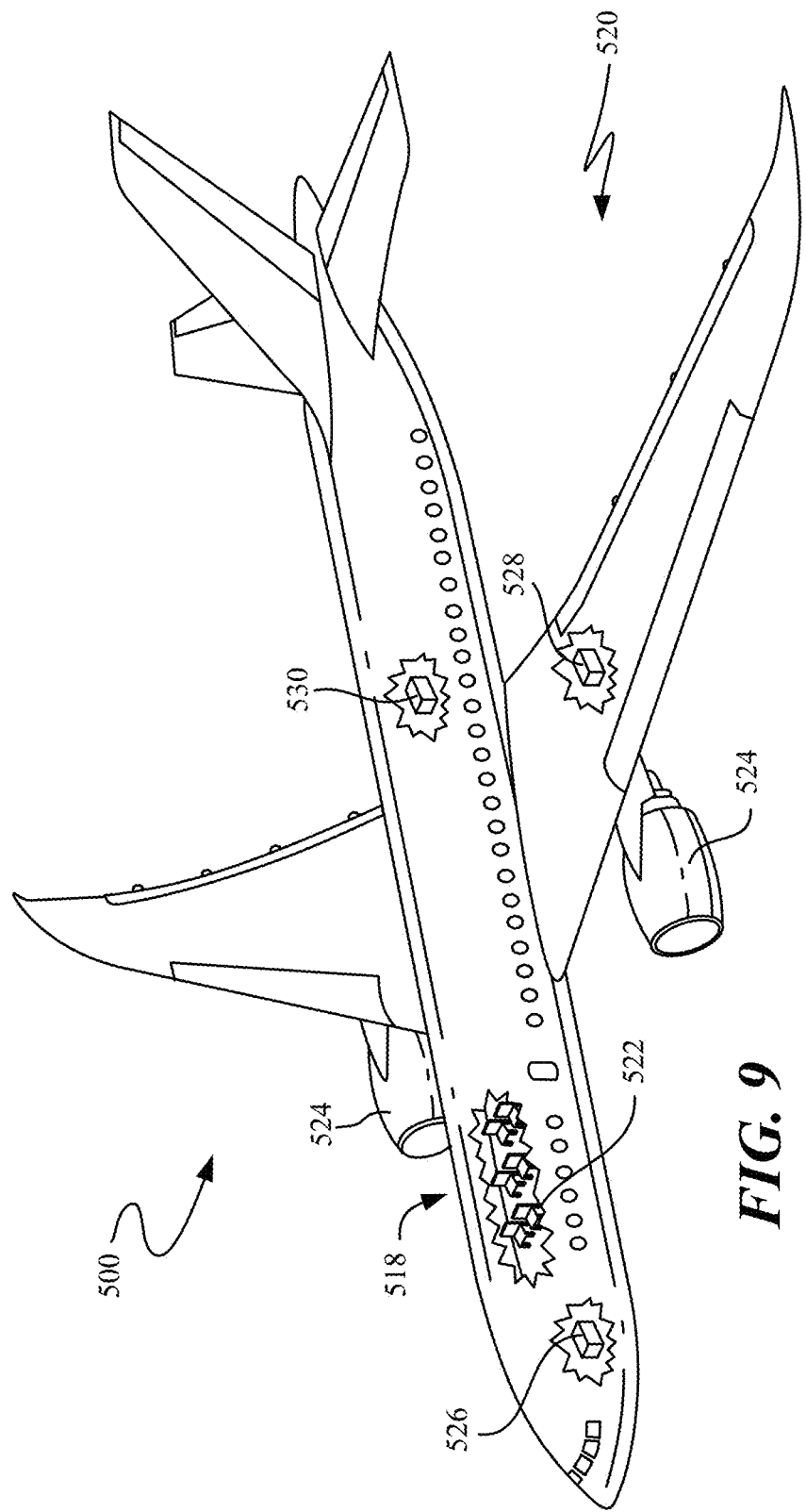

FIG. 8 is a block diagram of an aircraft production and service methodology that may utilize the gimbal described with respect to FIGS. 2-7, according to one aspect of the present disclosure FIG. 9 is a schematic illustration of an aircraft that may utilize a gimbal in accordance with FIGS. 2-7, according to one aspect of the present disclosure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

Assemblies for actuating an aerodynamic high lift device on an aircraft are described. In one embodiment, a shaft extending from the actuator can be used to impart a force generated by the actuator via a plurality of mechanical linkages to the aerodynamic high lift device. A gimbal can be coupled to the shaft to provide a rotational interface between a driver arm coupled to the aerodynamic high lift device and the shaft. The gimbal and its associated rotational interface can minimize the likelihood of the shaft being bent during operation.

A split design for the gimbal is described. The split design can include two receivers which can be coupled to posts on a nut. The nut can be secured to the shaft, which is coupled to the actuator, and the driver arm can be coupled to rotational attachment points on the receivers. The split design can provide more compact form factor and is lighter in weight than traditional gimbal designs. Although the split design is described with respect to actuating a high lift device on an aircraft, it can be used in other applications. Thus, this implementation is described for the purposes of illustration only and is not meant to be limiting.

In more detail, an airplane and aerodynamic high lift devices used on an aircraft are described with respect to FIG. 1. With respect to FIG. 2, an assembly 40 including an actuator and a gimbal is described. The gimbal can be part of a force transfer assembly used to provide a load path from the actuator to a high lift device or another moveable structure on the aircraft.

With respect to FIGS. 3, 4 and 5, the gimbal shown in FIG. 2 is discussed. The gimbal includes a nut for receiving a shaft from the actuator. A first receiver and a second receiver secure the nut in place and provide a rotational interface. With respect to FIGS. 6A and 6B, an assembly including an actuator, a gimbal and a driver arm coupled to the gimbal is described. The driver arm can be attached directly to an aerodynamic high lift device, such as a flap (or indirectly attached via one or more additional linkages).

With respect to FIG. 7, a method of installing a gimbal is described. With respect to FIG. 8, an aircraft production and service methodology that may utilize the gimbal described with respect to FIGS. 2-7 is discussed. Finally, with respect to FIG. 9, a schematic illustration of an aircraft that may utilize the gimbal in accordance with FIGS. 2-7 is discussed.

Aerodynamic High Lift Devices on an Aircraft

FIG. 1 is a perspective view illustrating an airplane 2 and its associated aerodynamic high lift devices. On the wings 25, slats 5 are used near the leading edge of each wing. Near the trailing edge, spoilers 4, inboard (IB) flap 6, flaperon 8 and outboard (OB) flap 10, and an aileron 12 are provided on each wing. The aerodynamic high lift devices, such as the inboard flap 6, can be configured to articulate in some manner, relative to the wings 25.

This flap configuration is provided for the purposes of illustration only and is not meant to be limiting. For example, on a Boeing 737, there is no flaperon. As another example, some 777x designs include three flaps per wing whereas this design includes two flaps per wings The empennage 27 is provided with aerodynamic high lift devices including a vertical stabilizer 13, rudder 16 and rudder tab 18. The horizontal stabilizer 14 is provided with an elevator 20, which is an aerodynamic high lift device. The rudder 16 and rudder tab 18 can be configured to move relative to the vertical stabilizer and the elevator can be configured to move relative to the horizontal stabilizer.

The aerodynamic high lift devices, described above, utilize actuators to impart forces which cause the high lift devices to change positions. For example, actuators can be used to change the flap configurations during take-off and landing. A force transfer assembly can he used to transfer forces generated by the actuator to an aerodynamic high lift device or some other moveable structure on the aircraft. With respect to FIGS. 2-7, a split gimbal design is described which can be used as part of a force coupling mechanism between an actuator and an aerodynamic high lift devices.

Split Gimbal and Force Coupling Mechanisms

FIG. 2 is a perspective view of an assembly 40 including an actuator 50, a gimbal 60 and shaft 58. In one embodiment, the assembly can be mounted in a wing of an aircraft, such as wing 25 shown in FIG. 1. In other embodiments, the assembly 40 can be mounted in a vertical stabilizer or horizontal stabilizer of an aircraft (e.g., see vertical stabilizer 13 and horizontal stabilizer 14 in FIG. 1).

The gimbal 60 and the shaft can be used to transfer a motion generated by the actuator 50 to an aerodynamic high lift device. In one embodiment, a first end of a driver arm can be coupled to the gimbal 60 and a second end of the driver arm can be coupled directly or via one or more linkages to the aerodynamic high lift device (e.g., see FIGS. 6A and 6B). In this example, the actuator 50 can be configured to generate a motion as a rotational output which is transferred to the shaft 58. In general, the gimbal can be used to transfer a motion between an actuator, such as 50, and any type of moveable structure on an aircraft. Thus, the use of aerodynamic high lift device is provided for the purposes of illustration only and is not meant to be limiting.

In one embodiment, the shaft 58 can be a threaded shaft. The gimbal 60 can include a nut 62 which is threaded. The nut 62 can be configured to receive the shaft. For example, the nut can be rotated onto the shaft. The rotation of the shaft 58 can cause a translational movement 63 of the shaft 58. In particular, when the shaft 58 is rotated in a first direction the gimbal 60 can translate along the shaft 58 in a second direction and when the shaft is rotated in a third direction, opposite the first direction, the gimbal 60 can translate along the shaft 58 in a fourth direction opposite the second direction.

In particular embodiments, the shaft 58 can be between two and five inches in diameter. Thus, the nut 62 can be sized to accommodate the shaft (e.g., between two and five inches). This diameter is provided for the purposes of illustration only in other applications, such as non-aircraft applications, a smaller or larger diameter shaft can be utilized. The shaft 58 can have an end cap 61. The end cap 61 can prevent the gimbal from rotating off an end of the shaft 58. In one embodiment, the end cap 61 can be removable to allow the nut 62 to be threaded onto the shaft 58.

The gimbal 60 can include rotational attachment points, such as rotational attachment point 56. A driver arm coupled to the gimbal 60 via the rotational attachment points can rotate and translate when the gimbal 60 translates. The rotationally coupling the driver arm to the gimbal 60 can prevent the shaft 58 from being bent when the gimbal translates and the driver arm is actuated or at least reduce the likelihood of the shaft being bent.

In an alternate embodiment, the actuator can be a piston type actuator. The output of the actuator can be a linear motion which causes the shaft 58 to translate back and forth. In this example, the gimbal 60 can be secured to the shaft in a fixed location. Thus, when the shaft translates back and forth the gimbal 60 can also translate back and forth. The motion of the gimbal can transfer a force to a driver arm rotationally coupled to the gimbal 60 via the rotational attachment points, such as rotational attachment point 56.

FIG. 3 is an expanded perspective view of the gimbal 60 shown in FIG. 2. The gimbal 60 can include a nut 62 with a first aperture 66. As described above with respect to FIG. 2, via the first aperture 66, the nut can be configured to receive a shaft. For example, the nut 62 and the shaft can be threaded to allow the nut to be threaded onto to the shaft.

The nut 62 can include a first post 64a and a second post 64b. The first post 64a and the second post 64b are circularly shaped. The first post 64a and the second post 64b can be aligned along an axis. The orientation of the axis relative to the shaft, as shown in FIGS. 2, 6A and 6B is shown for the purposes of illustration only and is not meant to be limiting.

In one embodiment, a first bushing 68a can be placed over the first post 64a and a second bushing 68b can be placed over the second post 64b. The first bushing 68a and the second bushing 68h have an outer circular shape and an inner circular shape to fit over the first post 64a and the second post 64b. In other embodiments, the first bushing 68a and the second bushing 68b can have a different outer shape, such as a rectangular shape.

The nut 62 alone or nut 62, first bushing 68a and second bushing 68b can be secured in place using a first receiver 70a and second receiver 70b. The first receiver 70a can include a first top portion with a first opening 74a. Via the first opening 74a, the first top portion can partially surround the first hushing 68a and first post 64a or alternatively the first post 64a alone when a bushing is not used. In one embodiment, a shape of the first opening 74a can conform to an outer shape of bushing 68a or first post 64a.

The first receiver 70a can include a first bottom portion with a second opening 74b. Via second opening 74b, the first bottom portion can partially surround the second bushing 68b and second post 64b or alternatively the second post 64b alone when a bushing is not used. In one embodiment, a shape of the second opening 74b can conform to an outer shape of the second bushing 68b or second post 64b.

The second receiver 70b can include a second top portion with an opening (not shown), which is opposite first opening 74a, Via the opening, the second top portion can partially surround the first bushing 68a and first post 64a or alternatively the first post 64a alone when a bushing is not used. In one embodiment, a shape of the opening can conform to an outer shape of the first bushing 68a or first post 64a The second receiver 70b can include a first bottom portion with a third opening 74c. Via the third opening 74c, the first bottom portion can partially surround the second bushing 68b and second post 64b or alternatively the second post 64b alone when a bushing is not used. In one embodiment, a shape of the third opening 74c can conform to an outer shape of the second bushing 68b or second post 64b.

In one embodiment, the first receiver and the second receiver can be configured to be fastened together such that the first receiver 70a and the second receiver 70b are brought into contact. The first receiver and the second receiver can be secured together using at least one fastener, such as but not limited to one or more bolts, one or more clamps, an adhesive or combinations thereof. In this embodiment, the first bushing 68a and the second bushing 68b, as well as the first post 64a and second post 64b, can be completed surrounded by the first receiver 70a and the second receiver 70b.

When the first receiver 70a and the second receiver 70b are brought into contact, the openings, such as 74a and 74b, form a circle which surrounds the first bushing 68a. The circular opening formed by opening 74a and 74b can allow the first bushing 68a and/or the first post 64a to rotate relative to the first receiver 70a and the second receiver 70b. In general, the interface between the nut 62 and the receivers, 70a and 70b, whether or not a bushing is used, can be configured to allow the nut 62 rotate relative to the receivers.

In one embodiment, when a bushing is used, the openings, such as 74a and 74h, and the bushing, such as 68a, can be shaped to allow the bushing to rotate relative to the nut or the receivers. In another embodiment, the openings, such as 74a and 74b, and the bushing, such as 68a, can be shaped to allow only the nut 62 to rotate relative to the bushing. Thus, the bushing can be held in place relative to the receivers.

In addition, when the first receiver 70a and the second receiver 70b are brought into contact, the inner profiles 75 of the receivers form a second aperture, which is circularly shaped. The nut 62 is disposed within the second aperture and is surrounded by the first receiver 70a and the second receiver 70b. In alternate embodiments, the inner profiles of the receivers can form a non-circular shape, such as an ovular shape or a rectangular shape. Thus, the circular shape is provided for the purposes of illustration only and is not meant to be limiting.

In one embodiment, the first receiver 70a and the second receiver 70b can have a common shape. In alternate embodiments, the first receiver 70a and second receiver 70b can be shaped differently from one another. The first receiver 70a, the second receiver 70b, the nut 62, the first bushing 68a and the second bushing 68b can be generally formed from a metal, such as case hardened steel or titanium. Different metal compositions can be used for the different parts.

The first receiver 70a can include a first rotational attachment point 72a. The second receiver 70b can include a second rotational attachment point 72b. Via the first rotational attachment point 72a and the second rotational point 72b, a mechanism, such as a driver arm 102 (see FIGS. 6A and 6B) can be coupled to the gimbal 60. When the gimbal 60 translates, the driver arm can translate and can rotate about a rotational axis.

In one embodiment, the rotational attachment points can be about 0.7 inches across. The distance across the gimbal 60 as measured from the ends of the rotational attachment points can be about 6.6 inches. The diameter 82 can be about 4.5 inches. in alternate embodiments, the diameter 82 can range from one to ten inches across and the distance as measure across the rotational attachment points can be between 1.5 to twelve inches across. As mentioned above, the gimbal 60 can be formed from a metal such as steel or titanium.

The gimbal 60 is described with respect to an aerospace application. This example is provided for the purposes of illustration only and is not meant to be limiting. The split gimbal design illustrated in FIG. 3 can be used in other non-aerospace applications and can be sized accordingly.

FIGS. 4 and 5 are perspective views of the gimbal 60 shown in FIG. 2. In FIGS. 4 and 5, the first receiver 70a and the second receiver 70b are shown in contact with one another to fix an orientation of the nut 62 relative to the first receiver 70a and the second receiver 70b. As described with respect to FIG. 2, the inner profile of the receivers is a circular shape. The diameter 82 of the circle is smaller than the height of the nut between the first post and the second post. The diameter 82 is also smaller than the height between the top of the first bushing and the bottom of the second bushing.

In a traditional design, a single integrally formed component is used to surround the nut 62 and provide the rotational attachment points. Thus, to accommodate the nut 62 and allow it to be installed, a larger diameter is required as compared to the split gimbal design with the first receiver 70a and the second receiver 70b. Thus, the split gimbal design allows for a more compact and light weight design as compared to the traditional design. Thus, the split gimbal design provides a method to enhance the operational efficiency of a gimbal assembly via lighter weight, more compactness and more flexibility when assembling the gimbal.

FIG. 5 illustrates one example of a fastening scheme for securing the first receiver 70a to the second receiver 70b. Structures with two bolt openings, such as 92a and 92b, are formed on the first top portion of the first receiver 70a and the second top portion of the second receiver 70b. Via the bolt openings, two bolts can be inserted through the structures. The two bolts can be threaded to receive a nut on end. The nuts can be threaded onto to the bolt to secure the first receiver 70a to the second receiver 70b. Similar structures can be found on the first bottom portion of the first receiver 70a and the second bottom portion of the second receiver 70b and threaded bolts can be used in a similar manner as described for the top portions of the receivers.

Additional structures on the first top portion of first receiver 70a and the second top portion of the second receiver 70b can be used to secure the first bushing 68a in place. The structures include openings, such as an opening 94, which allow a first fastener (e.g., a bolt or pin) to be inserted. The first bushing 68a can include a slot 90 for guiding the bolt or pin. The bolt or pin can hold the first bushing 68a in place and also can help secure the first receiver to the second receiver. A similar structure can be used with a second fastener to secure the second bushing in place on the bottom of the gimbal 60.

FIGS. 6A and 6B are block diagrams of an assembly 100 including the actuator 50, the gimbal 60 and a driver arm 102 coupled to the gimbal. The driver arm 102 on a first end is coupled to the rotational interface 104. The rotational interface 104 can use the first rotational attachment point and the second rotational attachment point on the gimbal 60 (e.g., see FIG. 5). On the second end, the driver arm 102 can include an aerodynamic high lift device interface 106 which allows the driver arm to be coupled to an aerodynamic high lift device, such as flap or a spoiler.

The actuator 50 can cause the gimbal 60 to translate. For example, the actuator can generate a rotational output, which causes the shaft 58 to rotate. In one embodiment, the shaft 58 can be up to twenty inches long. However, longer shafts can be utilized and this example is provided for the purposes of illustration only. The rotation of the shaft 58 can cause the gimbal 60 to translate along path 59 in either direction depending on the rotational direction of the shaft.

The translational movement of the gimbal 60 can cause the first end of the driver arm 102 to translate and rotate about a rotational axis 54 at the rotational interface 104. The translational motion at the rotational interface 104 can cause a movement at the second end of the driver arm at interface 106. The movement at the interface 106 can generate additional movements, which can be transferred directly or via one or more mechanical linkages to the aerodynamic high lift device which can cause the aerodynamic high lift device to actuate. For example, a flap can rotate upwards or downwards in response to the translational motion of the gimbal 60

FIG. 7 is block diagram of a method 200 of assembling a gimbal, such as the gimbal described above with respect to FIGS. 2-6B. In 202, a nut can be interfaced with a shaft. For example, the nut and the shaft can be threaded and the nut can be threaded onto the shaft.

In 204, the first receiver and the second receiver can be placed around the nut. In one embodiment, the nut can have a first post and a second post and the first receiver and the second receiver can have openings which receive the first post and the second post. The nut can be disposed in a second aperture formed by the first receiver and the second receiver such that it is surrounded by the first receiver and the second receiver. In one embodiment, the first receiver and the second receiver can have a common and identical shape.

In 206, the first receiver can be secured to the second receiver using at least one fastener. For example, a plurality of pins or bolts can be used to secure the first receiver to the second receiver. When secured, the first receiver and the second receiver can be designed to have portions which contact one another when placed around the nut.

The first receiver and the second receiver can include a first rotational attachment point and a second rotational attachment point, respectively. In 208, a rotational interface can be provided which utilizes the first rotational attachment point and the second rotational point. The rotational interface can be used to secure a driver arm to the gimbal. When the gimbal translates, the driver arm can translate and rotate about a rotational axis associated with the rotational interface. As described above, during operation, this connection scheme can help prevent the shaft from being bent.

Examples of Aircraft Application

An aircraft manufacturing and service method 400 shown in FIG. 8 and an aircraft 500 shown in FIG. 9 are now described to better illustrate various features of processes and systems presented herein. During pre-production, aircraft manufacturing and service method 400 may include specification and design 404 of aircraft 500 and material procurement 406. The production phase involves component and subassembly manufacturing 408 and system integration 410 of aircraft 500. For example, the gimbals described above with respect to FIGS. 2-7 can be assembled and installed in this step. System integration can also occur before material procurement 406. Thereafter, aircraft 500 may go through certification and delivery 412 in order to be placed in service 414. While in service by a customer, aircraft 500 is scheduled for routine maintenance and service 416 (which may also include modification, reconfiguration, refurbishment, and so on). While the embodiments described herein relate generally to servicing of commercial aircraft, they may be practiced at other stages of the aircraft manufacturing and service method 400.

Each of the processes of aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 9, aircraft 500 produced by illustrative aircraft manufacturing and service method 400 in FIG. 8 may include airframe 518 with a plurality of high-level systems 520 and interior 522. Examples of high-level systems 520 include one or more of propulsion system 524, electrical system 526, hydraulic system 528, and environmental system 530. Any number of other systems may be included. For example, the assemblies including a split gimbal, such as shown in FIGS. 2-7 can be utilized, Apparatus and methods shown or described herein may be employed during any one or more of the stages of the aircraft manufacturing and service method 400. For example, components or subassemblies corresponding to component and subassembly manufacturing 408 may be fabricated or manufactured in a manner similar to components or subassemblies produced while aircraft 500 is in service. Also, one or more aspects of the apparatus, method, or combination thereof may be utilized during steps 408 and 410, for example, by substantially expediting assembly of or reducing the cost of aircraft 500. Similarly, one or more aspects of the apparatus or method realizations, or a combination thereof, may be utilized, for example and without limitation, while aircraft 500 is in service, e.g., maintenance and service 416.

Conclusion

Different examples and aspects of the apparatus and methods are disclosed herein that include a variety of components, features, and functionality. In particular, apparatus and methods associated with a gimbal are described. The gimbal can be used with an assembly that is used to actuate a high lift device on a wing used on an aircraft. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure. Many modifications and other examples of the disclosure set forth herein will come to mind to one skilled in the art to which the disclosure pertains having the benefit of the teachings presented in the foregoing descriptions and the associated drawings.

What is claimed is:

1. A method comprising:
attaching a shaft to an actuator;
attaching a nut, comprising a first post and a second post, to the shaft;
attaching a first receiver and a second receiver to the first post and the second post of the nut,
wherein the first receiver comprises a first rotational attachment point, and
wherein the second receiver includes a second rotational attachment point;
attaching the first receiver to the second receiver, thereby forming a gimbal; and
rotationally coupling a driver arm to the gimbal.

2. The method of claim 1, wherein the actuator is configured to apply a force to the shaft, which causes the nut, the first receiver, and the second receiver to translate.

3. The method of claim 2, wherein the force is rotational force which causes the shaft to rotate, which causes the nut, the first receiver and the second receiver to translate along the shaft.

4. The method of claim 2, wherein the nut and the shaft are threaded, and wherein attaching the nut to the shaft comprises threading the nut to the shaft.

5. The method of claim 1, wherein the nut comprises a first aperture, and wherein attaching the nut to the shaft comprises protruding the shaft into the first aperture.

6. The method of claim 1, wherein attaching the first receiver to the second receiver is performed using one or more fasteners.

7. The method of claim 1, wherein rotationally coupling the driver arm to the gimbal comprises rotationally attaching the driver arm to the first rotational attachment point and the second rotational attachment point.

8. The method of claim 7, wherein the driver arm to the first rotational attachment point and the second rotational attachment point prevents the shaft from being bent.

9. The method of claim 1, wherein the first receiver and the second receiver surround the nut and fix an orientation of the nut relative to the first receiver and the second receiver.

10. The method of claim 1, wherein attaching the first receiver to the first post comprises inserting the first post into a first opening of the first receiver, and wherein attaching the second receiver to the second post comprises inserting the second post into a second opening of the second receiver.

11. The method of claim 1, wherein the first receiver and the second receiver can have a common shape.

12. The method of claim 1,
wherein the first receiver comprises a first top portion and a first bottom portion, which surround the first post when attaching the first receiver to the first post, and
wherein the second receiver comprises a second top portion and a second bottom portion, which surround the second post when attaching the second receiver to the second post.

13. The method of claim 12, wherein:
the gimbal comprises a first bushing, which covers the first post, and a second bushing, which covers the second post,
the first top portion and the second top portion surround the first bushing and the first post, and
the first bottom portion and the second bottom portion surround the second bushing and the second post.

14. The method of claim 13, wherein the gimbal further comprises
a first fastener, coupled to the first receiver and the second receiver and configured to secure the first bushing in place, and
a second fastener, coupled to the first receiver and the second receiver and configured to secure the second bushing in place.

15. The method of claim 1, wherein a translational movement of the gimbal causes the driver arm to rotate about a rotational axis.

16. The method of claim 1, wherein the nut is secured at a fixed location to the shaft.

17. The method of claim 1, wherein a second aperture is circular, formed by attaching the first receiver to the second receiver, and wherein a diameter of the second aperture is smaller than a height of the nut between the first post and the second post.

18. The method of claim 1, wherein the driver arm is coupled to the gimbal at a first end of the driver arm.

19. The method of claim 18, wherein the driver arm is coupled to an aerodynamic high lift device at a second end of the driver arm, the second end being opposite of the first end.

20. The method of claim 19, wherein a first force from the actuator causes the gimbal to translate, which causes the first end of the driver arm to translate and rotate about a rotational axis, which transfers a second force to the second end of the driver arm to the aerodynamic high lift device, and which causes the aerodynamic high lift device to actuate.

* * * * *